US009158371B2

(12) United States Patent
Andrew et al.

(10) Patent No.: US 9,158,371 B2
(45) Date of Patent: Oct. 13, 2015

(54) CONTORTION OF AN ELECTRONIC APPARATUS (75) Inventors: Piers Andrew, Cambridge (GB); Teppo Tapani Jokinen, Espoo (FI); Lotta Maaria Partanen, Helsinki (FI); Jarkko Tapio Saunamaki, Vantaa (FI); Qifeng Yan, Espoo (FI); Mikko Anttilainen, Helsinki (FI); Okan Ogeturk, Helsinki (FI); Lassi Kaikkonen, Riihimäki (FI); Antti Salo, Lohja (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 13/637,157

(22) PCT Filed: Mar. 25, 2010

(86) PCT No.: PCT/IB2010/051323
§ 371 (c)(1),
(2), (4) Date: Apr. 2, 2013

(87) PCT Pub. No.: WO2011/117681
PCT Pub. Date: Sep. 29, 2011

(65) Prior Publication Data
US 2013/0194207 A1 Aug. 1, 2013

(51) Int. Cl.
*G06F 3/041* (2006.01)
*G06F 3/01* (2006.01)
(Continued)

(52) U.S. Cl.
CPC ............... *G06F 3/01* (2013.01); *G06F 1/1626* (2013.01); *G06F 1/1652* (2013.01); *G06F 1/1684* (2013.01); *G06F 3/03* (2013.01); *G06F 3/0338* (2013.01); *G06F 3/03547* (2013.01)

(58) Field of Classification Search
CPC ........... G06F 3/01; G06F 3/03; G06F 3/0338; G06F 3/03547; G06F 1/1626; G06F 1/1652; G06F 1/1684
USPC .......... 345/156–184, 690, 698; 257/678, 727, 257/758; 178/18.01–18.06; 359/847
See application file for complete search history.

(56) References Cited

U.S. PATENT DOCUMENTS 1,410,366 A    3/1922  Buchman
3,880,500 A *  4/1975  Kojabashian ................. 359/847
(Continued)

FOREIGN PATENT DOCUMENTS

CN    1598870 A    3/2005
CN    1617614 A    5/2005
(Continued)

OTHER PUBLICATIONS

Mina; *Samsung Unveils Flexible Android Smartphone*; http://www.androidauthority.com/samsung-unveils-flexible-android-smartphone-24933/ (8 pages), Oct. 5, 2013.
(Continued)

*Primary Examiner* — Prabodh M Dharia
(74) *Attorney, Agent, or Firm* — Harrington & Smith (57) ABSTRACT An apparatus including a body configured for resilient contortion from a neutral equilibrium shape by a user, the body having an exterior surface that resiliently contorts in response to user actuation and defines at least part of an exterior surface of the apparatus; and electronic circuitry including at least a processor and a display, controlled by the processor on at least a portion of the exterior surface of the body.

20 Claims, 5 Drawing Sheets

Bent Position (51) Int. Cl.
  *G06F 1/16* (2006.01)
  *G06F 3/03* (2006.01)
  *G06F 3/0338* (2013.01)
  *G06F 3/0354* (2013.01)

(56) References Cited

U.S. PATENT DOCUMENTS

| | | | |
|---|---|---|---|
| 4,483,020 A | 11/1984 | Dunn | 2/2.5 |
| 5,007,108 A | 4/1991 | Laberge et al. | 2/2 |
| 5,214,623 A | 5/1993 | Seager | 368/10 |
| 5,588,167 A * | 12/1996 | Pahno et al. | 5/606 |
| 5,706,026 A * | 1/1998 | Kent et al. | 345/156 |
| 5,771,489 A | 6/1998 | Snedeker | 2/12.5 |
| 5,795,430 A * | 8/1998 | Beeteson et al. | 156/350 |
| 5,923,318 A * | 7/1999 | Zhai et al. | 345/157 |
| 6,160,540 A | 12/2000 | Fishkin et al. | 345/184 |
| 6,441,809 B2 * | 8/2002 | Kent et al. | 345/177 |
| 6,556,189 B1 * | 4/2003 | Takahata et al. | 345/173 |
| 6,557,177 B2 | 5/2003 | Hochmuth | 2/159 |
| 7,075,527 B2 * | 7/2006 | Takagi et al. | 345/184 |
| 7,443,380 B2 | 10/2008 | Nozawa | 345/156 |
| 7,456,823 B2 | 11/2008 | Poupyrev et al. | 345/173 |
| 8,194,399 B2 | 6/2012 | Ashcraft et al. | 361/679.05 |
| 8,380,327 B2 | 2/2013 | Park | 700/1 |
| 8,581,859 B2 * | 11/2013 | Okumura et al. | 345/173 |
| 8,619,021 B2 * | 12/2013 | Hayton | 345/107 |
| 8,780,540 B2 | 7/2014 | Whitt et al. | 361/679.09 |
| 8,780,541 B2 | 7/2014 | Whitt et al. | 361/679.09 |
| 2001/0033275 A1 * | 10/2001 | Kent et al. | 345/173 |
| 2002/0033798 A1 * | 3/2002 | Nakamura et al. | 345/156 |
| 2002/0167495 A1 * | 11/2002 | Quinn et al. | 345/173 |
| 2003/0144034 A1 | 7/2003 | Hack et al. | 455/566 |
| 2003/0147205 A1 | 8/2003 | Murphy et al. | 361/680 |
| 2003/0210801 A1 | 11/2003 | Naksen et al. | |
| 2003/0214485 A1 | 11/2003 | Roberts | 345/173 |
| 2003/0227441 A1 | 12/2003 | Hioki et al. | 345/156 |
| 2004/0008191 A1 | 1/2004 | Poupyrev et al. | 345/156 |
| 2004/0017355 A1 * | 1/2004 | Shim | 345/157 |
| 2004/0035994 A1 | 2/2004 | Cho et al. | 248/276.1 |
| 2004/0046739 A1 | 3/2004 | Gettemy | 345/158 |
| 2004/0239631 A1 | 12/2004 | Gresham | |
| 2005/0051693 A1 | 3/2005 | Chu | 248/371 |
| 2005/0057527 A1 * | 3/2005 | Takenaka et al. | 345/173 |
| 2005/0140646 A1 | 6/2005 | Nozawa | 345/156 |
| 2005/0162389 A1 * | 7/2005 | Obermeyer et al. | 345/161 |
| 2005/0237308 A1 * | 10/2005 | Autio et al. | 345/173 |
| 2006/0007151 A1 * | 1/2006 | Ram | 345/163 |
| 2006/0077672 A1 | 4/2006 | Schaak | |
| 2006/0199999 A1 | 9/2006 | Ikeda et al. | |
| 2006/0238494 A1 | 10/2006 | Narayanaswami et al. | 345/156 |
| 2007/0040810 A1 | 2/2007 | Dowe et al. | 345/173 |
| 2007/0154254 A1 | 7/2007 | Bevirt | 403/56 |
| 2007/0205997 A1 | 9/2007 | Lieshout et al. | 345/204 |
| 2008/0018631 A1 | 1/2008 | Hioki et al. | 345/206 |
| 2008/0042940 A1 | 2/2008 | Hasegawa | 361/749 |
| 2008/0251662 A1 | 10/2008 | Desorbo et al. | |
| 2009/0058828 A1 | 3/2009 | Jiang et al. | 345/173 |
| 2009/0088204 A1 | 4/2009 | Culbert et al. | 455/556.1 |
| 2009/0115734 A1 * | 5/2009 | Fredriksson et al. | 345/173 |
| 2009/0184921 A1 | 7/2009 | Scott et al. | 345/156 |
| 2009/0219247 A1 | 9/2009 | Watanabe et al. | 345/157 |
| 2009/0237872 A1 | 9/2009 | Bemelmans et al. | 361/679.01 |
| 2009/0244013 A1 * | 10/2009 | Eldershaw | 345/173 |
| 2009/0326833 A1 * | 12/2009 | Ryhanen et al. | 702/33 |
| 2010/0011291 A1 | 1/2010 | Nurmi | 715/702 |
| 2010/0013939 A1 | 1/2010 | Ohno et al. | 348/208.5 |
| 2010/0108828 A1 | 5/2010 | Yu et al. | |
| 2010/0134428 A1 | 6/2010 | Oh | 345/173 |
| 2010/0141605 A1 | 6/2010 | Kang et al. | 345/174 |
| 2010/0164888 A1 * | 7/2010 | Okumura et al. | 345/173 |
| 2010/0228295 A1 | 9/2010 | Whitefield | |
| 2010/0238612 A1 | 9/2010 | Hsiao et al. | 361/679.01 |
| 2010/0263245 A1 | 10/2010 | Bowser | 40/517 |
| 2011/0057873 A1 | 3/2011 | Geissler et al. | 345/156 |
| 2011/0062703 A1 * | 3/2011 | Lopez et al. | 285/129.1 |
| 2011/0080155 A1 * | 4/2011 | Aldridge | 323/318 |
| 2011/0095999 A1 * | 4/2011 | Hayton | 345/173 |
| 2011/0141069 A1 * | 6/2011 | Hirakata et al. | 345/204 |
| 2011/0167391 A1 | 7/2011 | Momeyer et al. | 715/863 |
| 2011/0181494 A1 | 7/2011 | Wong et al. | 345/1.3 |
| 2011/0193771 A1 | 8/2011 | Chronqvist | 345/156 |
| 2011/0227822 A1 | 9/2011 | Shai | 345/156 |
| 2011/0241822 A1 | 10/2011 | Opran et al. | 340/4.31 |
| 2011/0298786 A1 * | 12/2011 | Cho et al. | 345/214 |
| 2012/0206375 A1 | 8/2012 | Fyke et al. | 345/173 |
| 2013/0187864 A1 * | 7/2013 | Paasovaara et al. | 345/173 |
| 2013/0286553 A1 | 10/2013 | Vanska et al. | 361/679.01 |
| 2013/0335929 A1 | 12/2013 | Cavallaro | 361/749 |
| 2014/0003006 A1 | 1/2014 | Ahn | 361/749 |

FOREIGN PATENT DOCUMENTS

| | | |
|---|---|---|
| CN | 101430601 A | 5/2009 |
| EP | 1770965 A1 | 4/2007 |
| EP | 1830336 A1 | 9/2007 |
| EP | 2315186 A2 | 4/2011 |
| EP | 2508960 A2 | 10/2012 |
| JP | 2004046792 A | 2/2004 |
| JP | 2004192241 A | 7/2004 |
| KR | 2006-0134130 A | 12/2006 |
| KR | 20090006718 A | 1/2009 |
| KR | 20090006807 A | 1/2009 |
| KR | 2009-001161 A | 2/2009 |
| TW | 200404248 A | 3/2004 |
| WO | WO 00/60438 A | 10/2000 |
| WO | WO-2005/093548 A1 | 10/2005 |
| WO | WO 2009/050107 A2 | 4/2009 |
| WO | WO-2010/041227 A1 | 4/2010 |
| WO | WO 2011/117681 A1 | 9/2011 |
| WO | WO 2011117681 A1 | 9/2011 |
| WO | WO 2011/144972 A1 | 11/2011 |
| WO | WO-2013/160737 A1 | 10/2013 |

OTHER PUBLICATIONS

"How Users Manipulate Deformable Displays as Input Devices", Sang-Su Lee et al Apr. 10-15, 2010, (pp. 1647-1656).

"Gummi: A bendable computer", Dr Ivan Poupyrev—http://ivanpoupyrev.com/proiects/gummi.php, (1994-2012), (7 pages).

"Murata Tactile controller TV remote hands-on (video)", Zach Honig—http://www.engadget.com2011/10/05/murata-tactile-controller-tv-remote-ands-on-vi . . . , (2012), (8 pages).

"Press release: revolutionary new paper computer shows flexible future for smartphones and tablets", http://www.hml.queensu.ca/paperphone, (2012), (2 pages).

Smith, Matt; *Nokia's kinetic future: flexible screens and a twisted interface*; Oct. 26, 2012; http://www.engadget.com/2011/10/26/nokias-kinetic-future-flexible-screens-and-a-twisted-interface/ (4 pages).

* cited by examiner

Top View

FIG. 3D

Left View

FIG. 3B

Front View

FIG. 3A

Right View

FIG. 3C

Bottom View

FIG. 3E

Perspective from Back
FIG. 3F

Perspective from Front
FIG. 3G

Back View
FIG. 3H

Bent Position
FIG. 4A

Twisted Position
FIG. 4B

CONTORTION OF AN ELECTRONIC APPARATUS

FIELD OF THE INVENTION

Embodiments of the present invention relate to contortion of an electronic apparatus. In particular, they relate to controlling an apparatus by contorting the apparatus.

BACKGROUND TO THE INVENTION

There are various different ways in which a user can control an apparatus via a man-machine-interface (MMI). For example, the apparatus may comprise a cursor control device such as a mouse or trackball. For example, the apparatus may have devices that enable tactile actuation such as keys, touch screens etc. For example, the apparatus may have devices that enable audio actuation such as a microphone and voice recognition circuitry.

BRIEF DESCRIPTION OF VARIOUS EMBODIMENTS OF THE INVENTION

According to various, but not necessarily all, embodiments of the invention there is provided an apparatus comprising: a body configured for resilient contortion from a neutral equilibrium shape by a user, the body having an exterior surface that resiliently contorts in response to user actuation and defines at least part of an exterior surface of the apparatus; and electronic circuitry including at least a processor and a display, controlled by the processor on at least a portion of the exterior surface of the body.

BRIEF DESCRIPTION OF THE DRAWINGS

For a better understanding of various examples of embodiments of the present invention reference will now be made by way of example only to the accompanying drawings in which.

DETAILED DESCRIPTION OF VARIOUS EMBODIMENTS OF THE INVENTION

The Figures schematically illustrate an apparatus 2 comprising: a body 20 configured for resilient contortion from a neutral equilibrium shape by a user, the body 20 having an exterior surface 28 that resiliently contorts in response to user actuation and defines at least part of an exterior surface 28 of the apparatus 2; and electronic circuitry 16 including at least a processor 4 and a display 14, controlled by the processor 4 on at least a portion of the exterior surface 28 of the body 20.

Contortion is the deformation of the body by twisting and/or bending. The extent of distortion facilitated by the body depends upon implementation. Resilient contortion implies that the body stays in its contorted state while held in that state and returns to its equilibrium shape when released.

An apparatus 2 may be a hand-portable electronic apparatus 2. It may, for example, be an apparatus sized to fit into a jacket pocket or be carried in the palm of a user's hand. The apparatus 2 may be a personal user device such as a mobile cellular telephone, a personal music player, a personal video player, a personal handheld computer, a personal digital assistant or similar.

Figure 1:
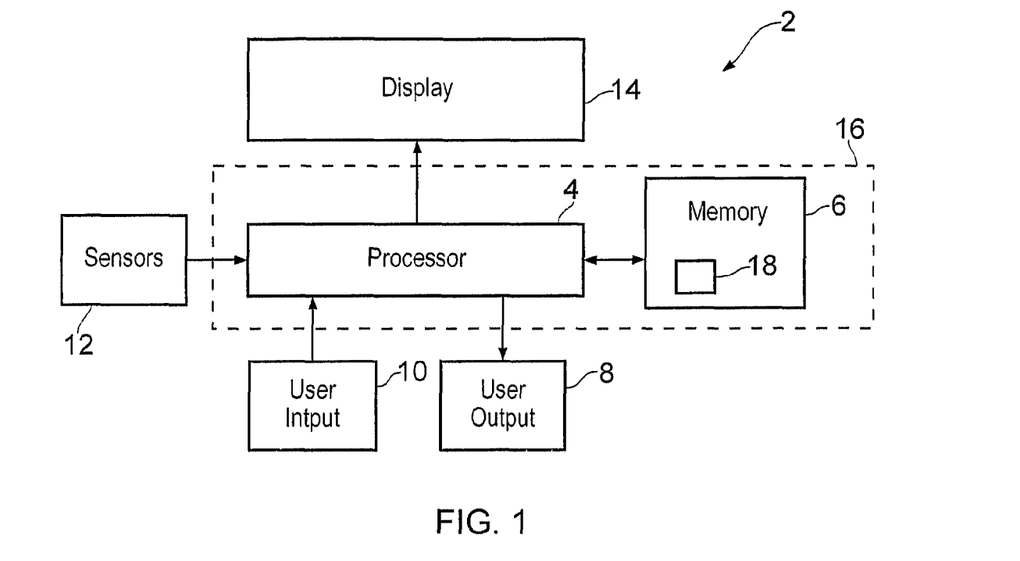
FIG. 1 schematically illustrates an example of an apparatus 2 and its functional components.

FIG. 1 schematically illustrates an example of the apparatus 2 and its functional components. In this example, the apparatus 2 not only comprises a display 14 and electronic circuitry 16 but also comprises sensors 12, a user input 10 and a user output 8.

The electronic circuitry 16 is configured to control the display 14 and user output 8. The electronic circuitry 16 is configured to receive input from the user input 10 and from the sensors 12.

The sensors 12 may be configured and positioned to detect contortions and other deformations of the body 20 by a user. The sensors 12 are configured to detecting and enable disambiguation of different contortions of the body 20. The electronic circuitry 16 receives an input from the sensors 12, identifies the detected contortion and controls the operation of the apparatus 2 in dependence upon the detected contortion.

The user input 10 may comprise a device for tactile user input such as a touch screen for the display 14 or a key or keypad and/or it may comprise a device for audio user input such as a microphone.

The user output 10 may comprise a device for visual user input such as lights and/or it may comprise a device for audio user output such as a loudspeaker or headphone socket.

The electronic circuitry 16 may be implemented using instructions that enable hardware functionality, for example, by using executable computer program instructions in a general-purpose or special-purpose processor that may be stored on a computer readable storage medium (disk, memory etc) 6 to be executed by such a processor 4.

In the illustrated example, the electronic circuitry 16 comprises a processor 4 and a memory 6. The processor 4 is configured to read from and write to the memory 6. The processor 4 may also comprise an output interface via which data and/or commands are output by the processor 4 and an input interface via which data and/or commands are input to the processor 4.

The memory 6 stores a computer program 18 comprising computer program instructions that control the operation of the apparatus 2 when loaded into the processor 4. The computer program instructions 18 provide the logic and routines that enables the apparatus to perform, for example, disambiguation of the inputs from the sensors 12 and to consequently control the apparatus 2 in dependence upon the detected contortions The processor 2 by reading the memory 6 is able to load and execute the computer program 18.

Figure 2:
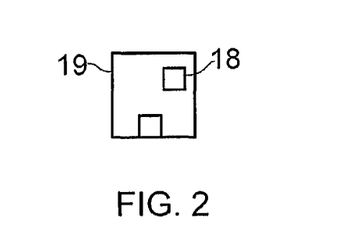
FIG. 2 schematically illustrates a delivery mechanism for a computer program.

Referring to FIG. 2, the computer program 18 may arrive at the apparatus 2 via any suitable delivery mechanism 19. The delivery mechanism 19 may be, for example, a computer-readable storage medium, a computer program product, a memory device, a record medium such as a CD-ROM or DVD, an article of manufacture that tangibly embodies the computer program 18. The delivery mechanism may be a signal configured to reliably transfer the computer program 18, such as an over-the-air radio signal. The apparatus 2 may propagate or transmit the computer program 18 as a computer data signal.

Although the memory 6 is illustrated as a single component it may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

FIGS. 3A-3G schematically illustrate an apparatus 2 comprising a body 20 configured for resilient contortion from a neutral equilibrium shape by a user. The body 20 has an exterior surface 28 that resiliently contorts in response to user actuation and defines at least part of an exterior surface 28 of the apparatus 2. The body comprises a display 14 on at least a portion of the exterior surface 28 of the body 20. The display is controlled by electronic circuitry 16 (not illustrated) including at least a processor 4.

The body 20 is formed from a plurality of rigid, protective, core segments $22_1, 22_2 \ldots 22_5$ arranged in a linear sequence and interconnected by respective flexible joints $24_1, 24_2 \ldots 24_5$ to form an interior skeleton for the body 20.

In this illustrated example, the display 14 is formed from a plurality of display segments $14_1, 14_2 \ldots 14_5$ on a front face of the body 20 and each core segment $22_1, 22_2 \ldots 22_5$ supports its own respective display segment $14_1, 14_2 \ldots 14_5$ on a front face of the body 20. However, in other embodiments, the display may be un-segmented and continuous and may overlie and be supported by the core segments $22_1, 22_2 \ldots 22_5$.

An elastomeric or gel material 27 may surround the interior skeleton and provide at least part of the exterior surface 28. In some embodiments, the material 27 may form a trim or skirt surrounded by a bezel 26 that circumscribes the interior skeleton. In other embodiments, the material may overlie the interior skeleton on at least the side and back faces. If the material overlies the front face, the display 14 may overlie or underlie the material depending upon implementation. The material may be transparent. The material may form an outer deformable portion and it may support the display 14.

The front face also has apertures 11. One aperture 11 may be used as a port to the user output 8, for example, a loudspeaker. Another aperture 11 may be used as a port to the user input 10, for example, a microphone.

Figure 3A:
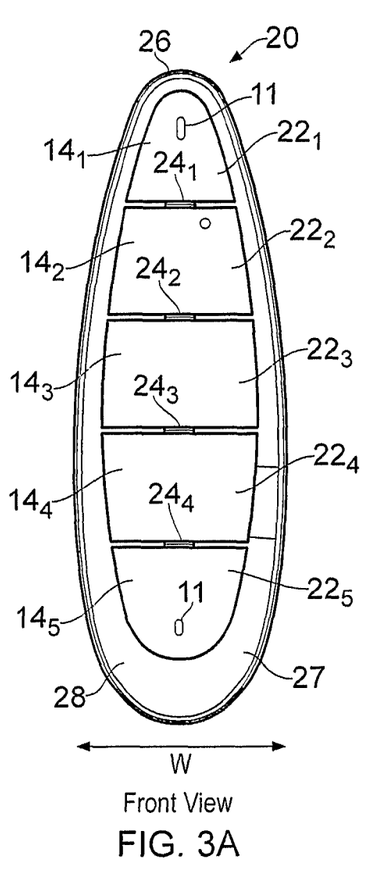
FIGS. 3A-3H schematically illustrate different views of one example of the apparatus 2.
Figure 3B:
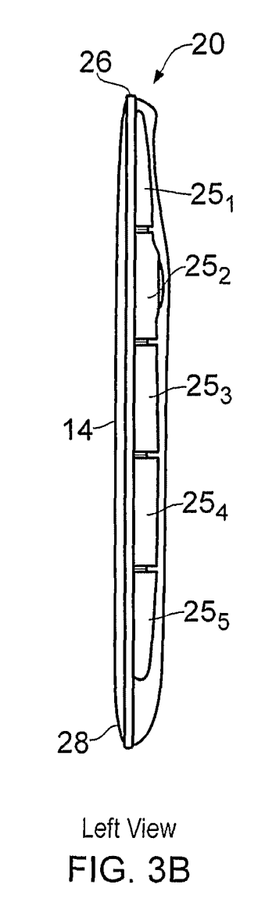
Figure 3C:
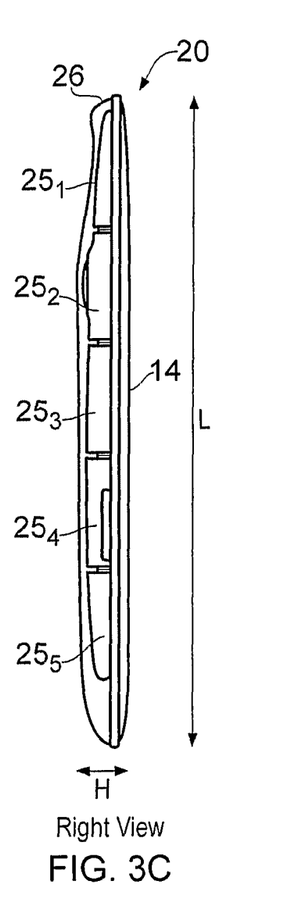
Figure 3D:
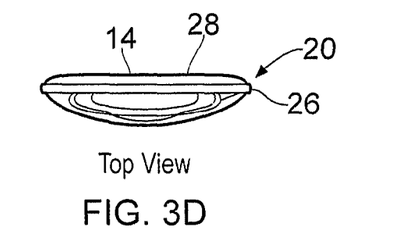
Figure 3E:
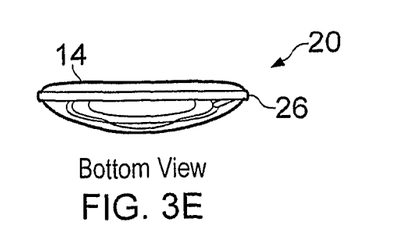
Figure 3F:
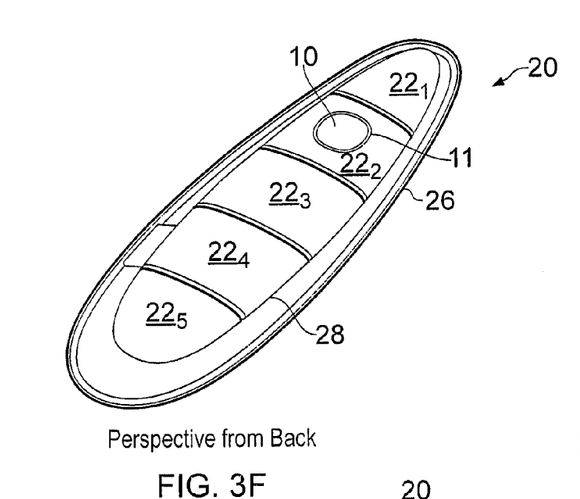
Figure 3G:
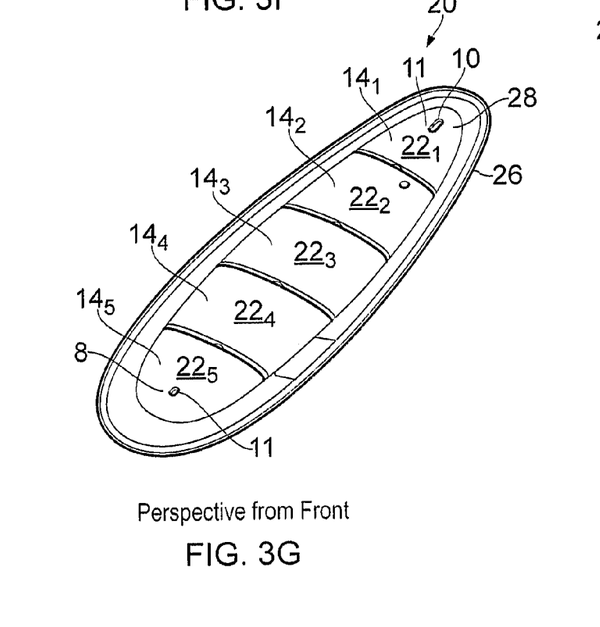
Figure 3H:
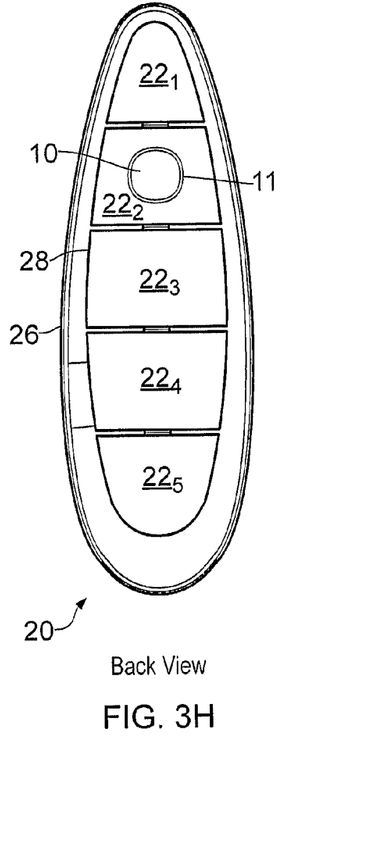

FIGS. 3B and 3C schematically illustrate cross-sections of the body 20. Each of the core segments $22_1, 22_2 \ldots 22_5$ comprises a respective cavity $25_1, 25_2 \ldots 25_5$ for housing some or all of the electronic circuitry 16. Electrical interconnections between the cavities 25 may pass through the flexible joints 24.

The display 14 whether segmented or not, may be configured for resilient contortion and may contort as the body contorts. Suitable displays may include organic light emitting diode (OLED) displays, polymer organic light emitting diode (P-OLED) displays, light emitting polymer (LEP) displays, flexible liquid crystal displays (e.g. cholesteric liquid crystal or polymer-dispersed liquid crystal), electrophoretic displays or electrowetting displays.

FIGS. 3A-3G schematically illustrate the body 20 when it is in its neutral equilibrium configuration. The body 20 has a substantially planar upper face that defines a length L and width W. The body also has a height H.

Figures 4A, 4B:
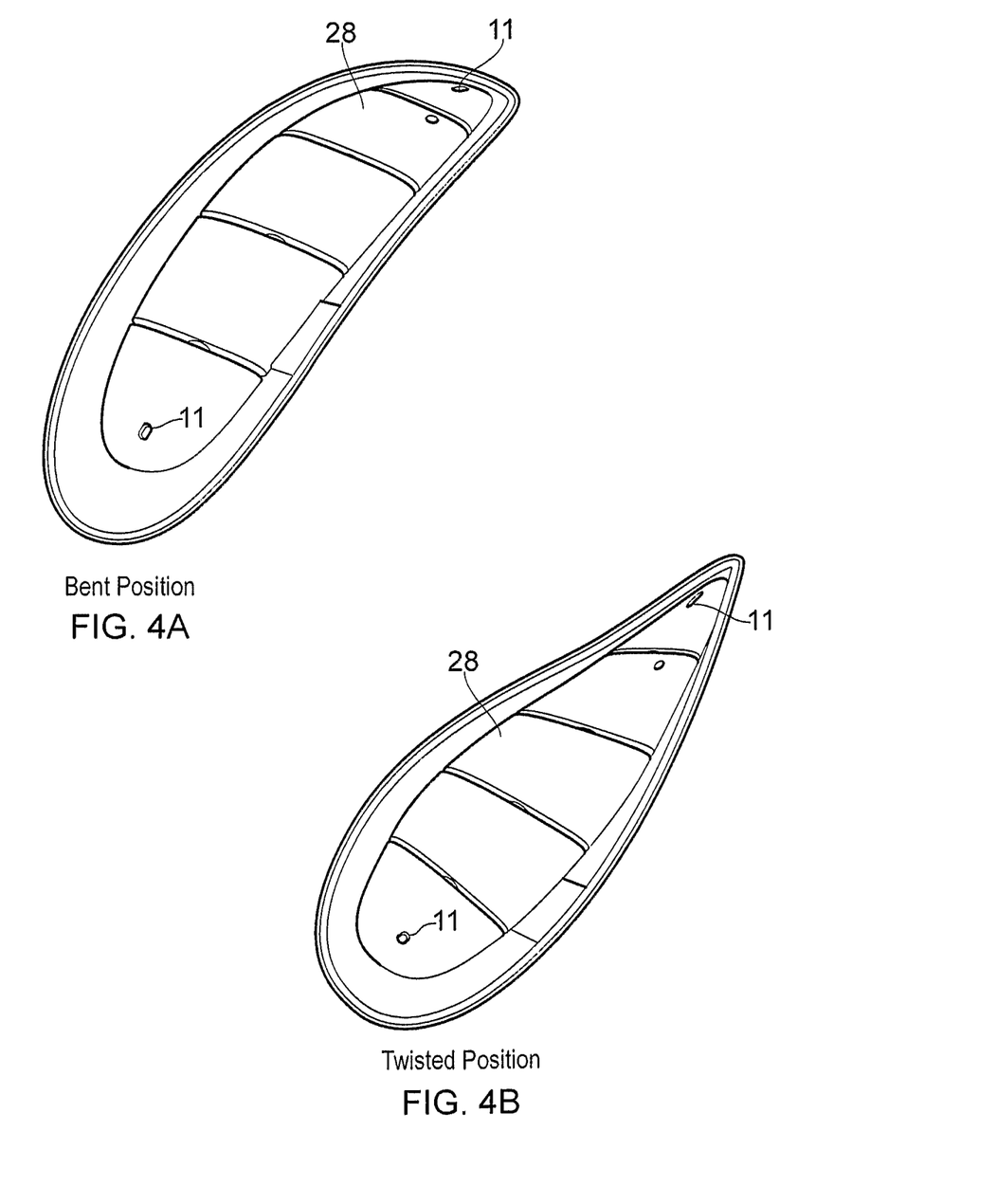
FIG. 4A schematically illustrates the body when it is in a cambered or bent configuration.
FIG. 4B schematically illustrates the body 20 when it is in a twisted or corkscrew configuration.

FIG. 4A schematically illustrates the body 20 when it is in a cambered or bent configuration. The body 20 is flexed so that its lengthwise extremities move downward and towards each other. The body 20 bows upwards as one moves along its length and forms an arc which presents a convex cambered upper surface and a concave cambered lower surface. This configuration is detected by the sensors 12. In response to the detection of this configuration the processor 4 performs a predetermined first action. The action may depend upon the extent/amplitude of bending and/or the direction of bending. For example, bending in one direction may cause zoom-in on a displayed image and bending in the other direction may cause zoom-out on a displayed image. The extent of zoom may be controlled by the degree of bending.

The body 20 may also assume a reverse cambered or bent configuration. The body 20 is flexed so that its lengthwise extremities move upward and towards each other. The body 20 bows downwards as one moves along its length and forms an upside down arc which presents a convex cambered lower surface and a concave cambered upper surface. This configuration is detected by the sensors 12. In response to the detection of this configuration the processor 4 performed a predetermined second action. The action may depend upon the extent/amplitude of bending and/or the direction of bending.

The sensors 12 may, for example, detect tensile and compressive forces in the lengthwise direction at the lower surface and compressive and tensile forces in the lengthwise direction at the upper surface. Alternatively, the sensors 12 may, for example, detect a direction of flex in the interconnecting joints 24.

FIG. 4B schematically illustrates the body 20 when it is in a twisted or corkscrew configuration. The lengthwise extremities of the body 20 are relatively rotated about a substantially lengthwise axis in opposite senses. The body 20 twists about the interconnecting joints 24 as one moves along its length and forms a twisting spiral. This configuration is detected by the sensors 12. In response to the detection of this configuration the processor 4 performs a predetermined third action.

The body 20 may also assume a reverse twisted or corkscrew configuration by relatively rotating the extremities of the body 20 in the opposite sense. This configuration is detected by the sensors 12. In response to the detection of this configuration the processor 4 performs a predetermined fourth action.

The sensors 12 may, for example, detect a direction of rotation in the interconnecting flexible joints 24.

Figure 5A:
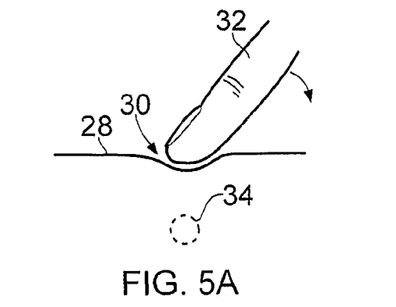
FIGS. 5A and 5B schematically illustrate an embodiment where a pivoting digit provide resilient user-deformation of the exterior surface of the body 20 which is interpreted as a joy-stick command.
Figure 5B:
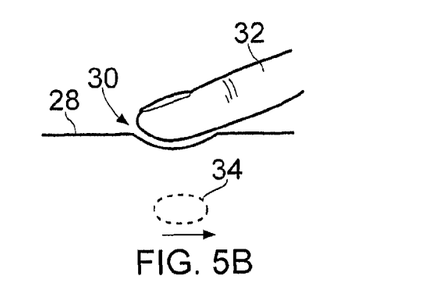
Figure 6:
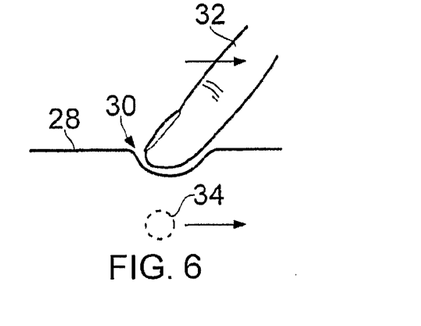
FIG. 6 schematically illustrates an embodiment where a tracing digit provides resilient user-deformation of the exterior surface of the body which is interpreted as a scrolling or browsing command.

FIGS. 5A, 5B and 6 schematically illustrate embodiments where the body 20 is configured for resilient user-deformation of the exterior surface 28 of the body 20. The body 20 may be as illustrated in FIGS. 3A to 3G and FIGS. 4A and 4B or it may be different, such as the body 20 illustrated in FIGS. 7A and 7B. The sensors 12 are configured to detect a time varying user-defined deformation of the exterior surface 28 of the body 20.

The FIGS. 5A, 5B and 6 schematically illustrate embodiments where the body 20 is configured for resilient user-deformation of the exterior surface 28 of the body 20 by a digit 32. The user digit contacts the exterior surface 28 of the body 20 which deforms to form a depression 30. The contact defines a contact area 34. The sensors 12 are configured to detect a motion of the contact area 34 as a user input command.

In FIGS. 5A and 5B, the user pivots the digit 32 about its point of contact. As the digit pivots downwards reducing the contact angle between the digit and the exterior surface 28, the contact area 34 changes shape and typically increases in size. The sensors 12 are configured to detect a dynamic change in the contact area and interpret it as an input joy-stick command where the digit 32 is the joy-stick.

In FIG. 6, the user traces the digit 32 along the exterior surface 28 while still creating the depression 30. As the digit moves the contact area 34 changes position. The sensors 12 are configured to detect a dynamic change in the position of the contact area 34 and interpret it as an input scrolling or browsing command.

Figures 7A, 7B:
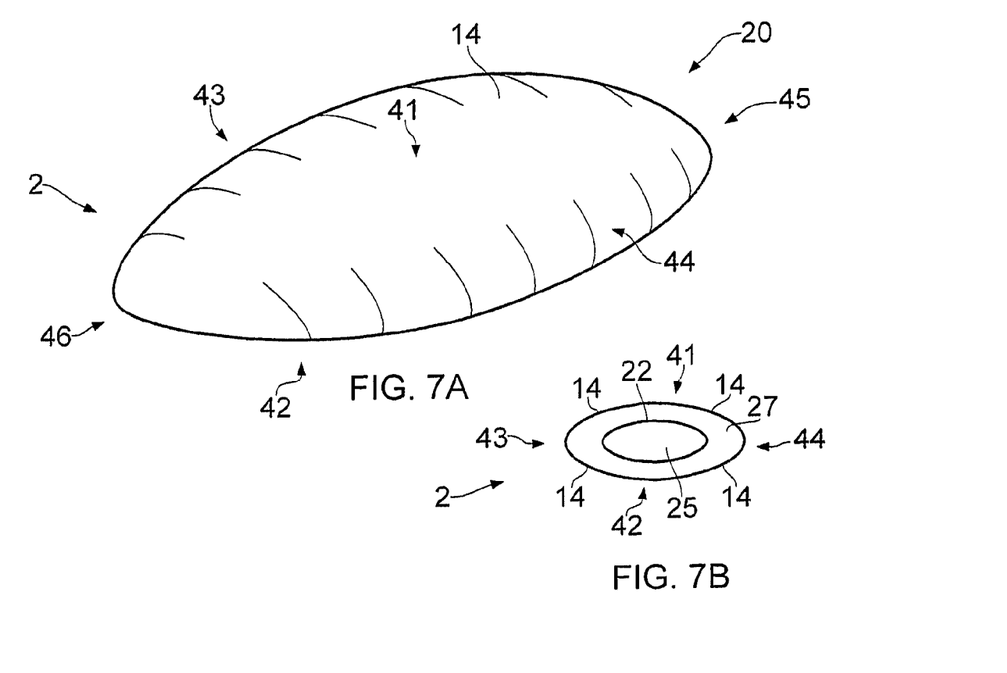
FIGS. 7A and 7B schematically illustrate a different embodiment of the apparatus 2 in which the body 20 that has a flattened ovoid or ellipsoid shape.

FIG. 7A schematically illustrates another embodiment of the apparatus 2 in perspective view and FIG. 7B illustrates the apparatus 2 in cross-sectional view. In this embodiment, the apparatus 2 has a body 20 that has a flattened ovoid or ellipsoid shape that resembles a pebble and generally has only curved edges. The body 20 has an exterior surface 28 that resiliently contorts in response to user actuation and defines at least part of an exterior surface 28 of the apparatus 2. The body 20 comprises a front face (projection) 41, a back face (projection) 42 and side faces (projections) 43, 44, 45, 46. The display 14 extends over at least a portion of all of the faces and over the whole of the front face 41.

The body 20 is configured for resilient contortion from a neutral equilibrium shape by a user. The display 14 may be supported by a resiliently deformable material 27 that surrounds an inner protective core 22 that houses the electronic circuitry in a cavity 25. The material 27 may, for example, comprise a gel or fluid in a in a sealed sac and/or comprise elastomer. The body 20 may be contorted by bending or twisting, for example. The contortion may arise wholly or predominantly by contortion of the deformable material 27 with the inner protective core 22 remaining unchanged.

Although embodiments of the present invention have been described in the preceding paragraphs with reference to various examples, it should be appreciated that modifications to the examples given can be made without departing from the scope of the invention as claimed. For example, although apertures have been described, in some embodiments the body 20 may have no apertures or sockets and have a continuous, uninterrupted exterior surface.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising:
   a body configured for resilient contortion from a neutral equilibrium shape by a user, the body having an exterior surface that resiliently contorts in response to user actuation and defines at least part of an exterior surface of the apparatus; and
   electronic circuitry including at least a processor and a display, controlled by the processor on at least a portion of the exterior surface of the body, wherein the body comprises at least one interior rigid portion and an outer deformable portion and wherein the processor is located within the interior rigid portion and the display is located on the outer deformable portion.

2. An apparatus as claimed in claim 1, further comprising sensors, for detecting different contortions of the body, and wherein operation of the apparatus is dependent upon the detected contortions.

3. An apparatus as claimed in claim 1, wherein the body has a length, a width and a height and wherein contortion of the body lengthwise to form an arc is detected as a first user input to the apparatus.

4. An apparatus as claimed in claim 1, wherein the body has a length, a width and a height and wherein contortion of the body by twisting about an axis running lengthwise is detected as a second user input to the apparatus.

5. An apparatus as claimed in claim 1, wherein the body is configured for resilient deformation of the exterior surface of the body, the apparatus further comprising sensors, for detecting a time varying user-defined deformation of the exterior surface of the body.

6. An apparatus as claimed in claim 5, wherein the sensors are configured to detect a motion of a depression in the exterior surface of the body as a user input command.

7. An apparatus as claimed in claim 6, wherein the sensors are configured to detect a motion caused by a pivoting of a user's digit depressing the exterior surface of the body as a user input joy-stick command.

8. An apparatus as claimed in claim 6, wherein the sensors are configured to detect a motion caused by tracing of a user's digit depressing the exterior surface of the body as a user input scrolling or browsing command.

9. An apparatus as claimed in claim 1, wherein the display is configured for resilient contortion.

10. An apparatus as claimed in claim 1, wherein the body comprises a front face, a back face and side faces, and wherein the display extends over at least a portion of the front face and over one or more side faces.

11. An apparatus as claimed in claim 1, wherein the body comprises a front face, a back face and side faces, and wherein the display extends over at least a portion of the front face and over one or more side faces onto the back face.

12. An apparatus as claimed in claim 1, wherein the body comprises a front face, a back face and side faces, and wherein the display extends over at least a portion of all of the faces.

13. An apparatus as claimed in claim 1, wherein the body has one or more apertures and comprises one or more cavities configured to house the electronic circuitry.

14. An apparatus as claimed in claim 1, wherein the outer deformable portion supports the display.

15. An apparatus as claimed in claim 14, wherein the outer deformable portion comprises a gel or fluid or elastomer.

16. An apparatus as claimed in claim 1, wherein the body comprises a plurality of rigid components interconnected by flexible joints.

17. An apparatus as claimed in claim 1, wherein the electronic circuitry is comprised within at least one protective core defining a cavity.

18. An apparatus as claimed in claim 1, wherein the electronic circuitry is comprised within a plurality of interconnected cores, each core defining a cavity.

19. An apparatus as claimed in claim 1, wherein the electronic circuitry is comprised within a rigid skeleton structure.

20. An apparatus as claimed in claim 1, wherein the apparatus is a hand-portable electronic apparatus.

* * * * *